(12) United States Patent
Grabenauer et al.

(10) Patent No.: US 11,959,810 B2
(45) Date of Patent: Apr. 16, 2024

(54) PROTECTIVE TUBE HAVING VIBRATION REDUCTION

(71) Applicant: WIKA Alexander Wiegand SE & Co. KG, Klingenberg (DE)

(72) Inventors: Kai Grabenauer, Obernburg (DE); Adam Delancey, Edmonton (CA)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 521 days.

(21) Appl. No.: 17/175,694

(22) Filed: Feb. 14, 2021

(65) Prior Publication Data

US 2021/0164842 A1 Jun. 3, 2021

Related U.S. Application Data

(63) Continuation of application No. PCT/EP2019/071397, filed on Aug. 9, 2019.

(30) Foreign Application Priority Data

Aug. 14, 2018 (DE) ..................... 10 2018 006 386.1

(51) Int. Cl.
*G01K 1/08* (2021.01)
*G01K 13/024* (2021.01)
*G01N 1/22* (2006.01)

(52) U.S. Cl.
CPC ............. *G01K 1/08* (2013.01); *G01K 13/024* (2021.01); *G01N 1/2247* (2013.01); *G01N 2001/2285* (2013.01)

(58) Field of Classification Search
CPC ........ G01K 1/08; G01K 13/024; G01K 13/02; G01N 1/2247; G01N 2001/2285
See application file for complete search history.

(56) References Cited

U.S. PATENT DOCUMENTS

| 3,076,533 A | 2/1963 | Scruton et al. |
| 3,801,377 A | 4/1974 | Brewer et al. |
| 3,890,162 A | 6/1975 | Dawson et al. |

(Continued)

FOREIGN PATENT DOCUMENTS

| DE | 102016111736 A1 | 12/2017 |
| GB | 2433116 A | 6/2007 |

(Continued)

OTHER PUBLICATIONS

International Search Report dated Nov. 14, 2019 in corresponding application PCT/EP2019/071397.

(Continued)

*Primary Examiner* — Eric S. McCall
*Assistant Examiner* — Timothy P Graves
(74) *Attorney, Agent, or Firm* — Muncy, Geissler, Olds & Lowe, P.C.

(57) ABSTRACT

A protective tube, in particular for sealed introduction into a process space having a flow directed in a direction, having a hollow body, which is closed at its lower end, an opening at its upper end for introducing a temperature sensor; and at its upper end has a contour for sealing to a process space. The hollow body is cylindrical inwardly, an outer contour of the hollow body tapers toward the closed lower end, and at least in sections, at least one helix structure is arranged on the outer contour and/or at least in sections, at least one helix structure is arranged in the outer contour. A gas sample collector for introduction into a process space is also provided.

26 Claims, 18 Drawing Sheets

(56) References Cited

U.S. PATENT DOCUMENTS

| | | |
|---|---|---|
| 4,603,026 A | 7/1986 | Martin |
| 4,749,415 A | 6/1988 | Barton |
| 4,948,264 A | 8/1990 | Hook, Jr. |
| 4,991,976 A | 2/1991 | Byles |
| 5,398,559 A | 3/1995 | Westlake, III et al. |
| 5,662,418 A * | 9/1997 | Deak ..................... G01K 13/02 374/208 |
| 5,907,107 A | 5/1999 | Welker |
| 6,352,361 B1 | 3/2002 | Nimberger et al. |
| 6,823,716 B2 | 11/2004 | Kelner et al. |
| 9,766,163 B2 | 9/2017 | Knight |
| 2008/0031306 A1 | 2/2008 | Yamada et al. |
| 2008/0307901 A1 | 12/2008 | Knight |
| 2009/0211368 A1* | 8/2009 | Garnett ..................... G01F 1/46 73/861.65 |
| 2013/0142216 A1* | 6/2013 | Kleven ................. G01K 13/02 374/208 |

FOREIGN PATENT DOCUMENTS

| | | | |
|---|---|---|---|
| GB | 2433122 A | * 6/2007 | ............... G01K 1/08 |
| GB | 2442488 A | 4/2008 | |
| JP | S60154826 U | 10/1985 | |
| JP | H1123373 A | 1/1999 | |
| WO | WO2010116517 A1 | 10/2010 | |

OTHER PUBLICATIONS

Robert D. Blevins: "Flow-Induced Vibration" Krieger Publishing Company, Malabar, Florida, 2001 (Abb. (a) p. 18).

"JSME Standard S012-1998 Guideline for Evaluation of Flow-Induced Vibration of a Cylindrical Structure in a Pipe", JSME International Journal vol. 44, Edition 4, 2001, pp. 682-687.

Chinese Office Action dated Jan. 5, 2023 in corresponding application 201980054420.9.

* cited by examiner

PROTECTIVE TUBE HAVING VIBRATION REDUCTION

This nonprovisional application is a continuation of International Application No. PCT/EP2019/071397, which was filed on Aug. 9, 2019 and which claims priority to German Patent Application No. 10 2018 006 386.1, which was filed in Germany on Aug. 14, 2018 and which are both herein incorporated by reference.

BACKGROUND OF THE INVENTION

Field of the Invention

The present invention relates to a protective tube for sealed introduction into a process space having a flow. Furthermore the invention relates to a gas sample collector for introduction into a process space having a flow.

Description of the Background Art

In general, protective tubes for temperature sensors and gas sample collectors are known in the art, wherein the protective tube along with a temperature sensor or the gas sample collector is introduced in a process space having a flow of a medium in a sealed manner.

For reducing vibration it is known in general that so called helix coils are arranged on an outside of bodies. This is for example described in U.S. Pat. No. 3,076,533 A in general for bodies as well as in U.S. Pat. No. 4,991,976 A, GB 2 442 488 A, JP 3 126 141 U and GB 2 433 122 A for protective tubes.

Further, this is described for various structures in "R. D. Blevins: Flow-Induced Vibration; Krieger, Florida, 2001 (Abb. (a) Seite 18)", in "ASME STS-1-2011" and in "DIN EN 1993-3-2:2006".

Furthermore, protective tubes and requirements in this regard are described in "Fluids and Thermal Engineering, Japanese Journal JSME Vol. 44, Edition 4, 2001 and in "ASME für Schutzrohre, Thermowells PTC 19.3 TW-2016".

SUMMARY OF THE INVENTION

It is therefore an object of the present invention to provide a protective tube and a gas sample collector improved relative to the prior art.

In an exemplary embodiment, a protective tube is provided, in particular for sealed introduction into a process space having a flow directed in a direction, that comprises a hollow body which is closed at its lower end, which comprises an opening at its upper end for introducing a temperature sensor and which at its upper end comprises a contour for sealing to a process space.

An inner surface of the hollow body preferably can comprise a cylindrical shape and/or comprises multiple sections respectively having a preferably cylindrical shape, wherein at least one section of an outer contour of the hollow body tapers toward the closed lower end. At least in sections, at least one helix structure is arranged on the outer contour and/or at least in sections, at least one helix structure is arranged in the outer contour.

In the following, the term protective tube may be used as a jacket protection for temperature sensors; however, the protective tube can also be provided with an opening or with multiple openings along an imaginary line, and thus be utilized as a protective tube for gas sample takings or as a gas sample collector, respectively. In this context the imaginary line runs starting from the lower end to the upper end of the gas sample collector such that the protective tube is designed similar to a recorder, i.e. its outer appearance resembles a recorder.

In other words: The protective tube comprises a tapering basic tube comprising at its tip a thinner end than at its root. Moreover, the basic tube is provided with a preferably cylindrically designed bore or a stepped bore having multiple cylindrical sections of different diameter for introducing one or more temperature sensors. The helix structure provided in addition to the tapering outer contour causes an irregular stall of the flow in an advantageous manner and diminishes or reduces vibration or even rise of an oscillation.

Numerous tests and variations of the protective tube have turned out that only the combination of a tapering outer contour and the arrangement of the at least one helix structure result in excellent stability of the protective tube with virtually all fluids and in almost all flow situations.

If a vibration should occur anyway, it will be significantly attenuated and cannot lead to tear-off of the protective tube due to very low amplitude.

At the same time, the protective tube can be produced particularly inexpensively.

The production is performed for example from solid material by milling, from tubing or by arranging the at least one helix structure on prefabricated protective tubes. The helix structure can be right-handed as well as left-handed in this context. It is also possible to produce the protective tube by 3D printing.

The outer contour of the hollow body can be conically shaped or conically shaped in sections or a diameter of the outer contour decreases at least in sections toward the closed lower end in a nonlinear manner. Such a conical shape or nonlinear decrease of the diameter of the outer contour of the hollow body allows for a particularly high resistance against vibrations on the one hand and a particularly simple and cost-efficient production on the other hand.

An upper section of the outer contour can be devoid of a structure, in particular the helix structure. In this context the upper section is conical or its diameter decreases toward the closed lower end in a nonlinear manner. A lower section of the outer contour of the hollow body is cylindrical and comprises at least one helix structure arranged on the outer contour and/or at least one helix structure arranged in the outer contour. Such a design has turned out to be particularly resistant to vibrations. Furthermore, the fact that the upper section is devoid of a structure brings about that so called dead spaces are avoided when this section is arranged within a flange socket of a process space, and consequently, deposits of a medium carried are minimized in the section. Furthermore, the upper section may serve as a guidance support for introducing the protective tube into a respective opening of the process space, wherein due to the absence of a structure damage of the process space and/or the protective tube, in particular formation of chips due to abrasion of material and an associated contamination of the process space by debris is prevented. Moreover, the arrangement of the helix structure only in sections results in lower material consumption and costs during production of the protective tube.

A length ratio of the upper section to the lower cylindrical section of the outer contour can be 1:2.0 to 1:3.5, in particular 1:2.5 to 1:3.0. Such a configuration has turned out to be particularly resistant to vibrations. Furthermore, the protective tube can be adapted to scales between a flange socket and a process space this way.

The upper section and the lower cylindrical section of the outer contour can merge continuously and/or without forming an edge. Such a configuration has also turned out to be particularly resistant to vibrations and at the same time allows for affecting the flow in the process space only to a minor degree.

The upper section of the outer contour can have a length of 70 mm to 200 mm, in particular 95 mm to 120 mm, in particular 100 mm. At these dimensions, the protective tube is characterized by a particularly high mechanical stability. In particular, reasonable stabilities for certain vibrational excitations may be realized and absence of failure of the protective tube can be ensured for its working life.

The upper section of the outer contour can exhibit a cone angle of 1° to 7°, in particular 2° to 6°, in particular 3° to 5° degrees relative to a central axis. Such a configuration of the cone angle has turned out to be particularly flow proof and mechanically stable in flow tests. At the same time, the protective tube can be produced in a particularly material saving way and thus particularly cost efficiently.

The hollow body can exhibit a diameter of 20 mm to 30 mm at its root formed at its upper end. This allows for realizing a broad usability at high mechanical stability at the same time.

The hollow body can exhibit a diameter of 16 mm to 25 mm, in particular 19 mm, at its tip formed at its lower end. Due to this relatively low diameter a particularly fast temperature measurement may be performed.

The upper section of the hollow body can be devoid of the at least one helix structure and exhibits a length of 100 mm to 125 mm. Such lengths have turned out to be particularly favorable both technically and economically. Furthermore, the fact that the upper section is devoid of a structure brings about that so called dead spaces are avoided when this section is arranged within a flange socket of a process space, and consequently, deposits of a medium carried are minimized in the section. Furthermore, the upper section may serve as a guidance support for introducing the protective tube into a respective opening of the process space, wherein due to the absence of a structure damage of the process space and/or the protective tube, in particular formation of chips due to abrasion of material and an associated contamination of the process space by debris is prevented. Moreover, the arrangement of the helix structure only in sections results in lower material consumption and costs during production of the protective tube.

A third section can be arranged as a transitional section between the upper section and the lower section having at least one helix structure, wherein the third section is conically formed or wherein the diameter of the third section decreases in a nonlinear way. This way, in addition to a high resistance to vibrations, a particularly simple, material saving and cost efficient production may be realized.

The at least one helix structure can be interrupted at several places. Such a design has turned out to be particularly resistant to vibrations as an improved turbulence of the flow of the medium is achieved due to the interruption. Moreover, the helix structure may be produced with less material consumption and more cost efficient due to its interruption when using a metal and/or die cast process.

The at least one helix structure can be configured as a triple helix or quadruple helix. Such a design has turned out to be particularly resistant to vibrations.

Sections of multiple helices can be arranged vertically offset on the outer contour of the hollow body. Such a design has turned out to be particularly resistant to vibrations.

The vertical offset of the helices can equal a value of a pitch divided by a number of the helices. Such a design has turned out to be particularly effective for causing turbulences in the flow of the medium.

The at least one helix structure can be formed from round stock and/or exhibits a round cross section. The at least one helix structure can exhibit a box shaped cross section, wherein edges of the at least one helix structure not connected with the hollow body are deflashed or broken. Alternatively or in addition, a radial transition is formed between edges of the at least one helix structure adjoining the hollow body and the hollow body. The at least one helix structure can exhibit a trapezoid cross section. The at least one helix structure can exhibit a triangular cross section. The different cross sections of the helix structure allow for generating application specific functions. As different tools having different costs are used to produce different cross sections, costs may be optimized and material consumption may be minimized by application related adaptations of the cross sections.

The hollow body's upper end can be connected to a flange or the hollow body exhibits a flange affiliating to the upper end. In this context the hollow body is reinforced by a radius or a contour toward the flange. In particular, upper saucer shaped sections are referred to as flanges, the upper saucer shaped sections formed or welded to the upper end of the protective tube or configured as homogenous components together and as one piece with the hollow body and serving for sealing to the process space having the fluid. Further connection and sealing geometries such as threads, weld-in surfaces or clamp collars are also possible though.

The outer contour radially reinforces in the upper third of the hollow body. This allows for realizing a mechanically particularly stable design of the protective tube.

The outer contour can taper logarithmically in a lower third of the hollow body. This logarithmic tapering results in a particularly high mechanical stability of the protective tube while having particularly low material input at the same time.

A material thickness of the at least one helix structure can equal a 0.1-fold to 0.15-fold of the diameter of the hollow body present at the respective position of the helix structure or of a diameter present at a different position of the hollow body. This variance in material thickness leads to a reduction in material consumption and costs as well as to an optimization of the influence on the flow.

The pitch of the at least one helix structure can increase toward an upper end of the hollow body. Flow tests have shown that such a configuration is particularly suitable for special applications and that such a configuration causes a high resistance of the protective tube to vibrations.

A material thickness of the at least one helix structure can decrease toward the upper end of the hollow body. Flow tests have shown that such a configuration is also particularly suitable for special applications and that such a configuration causes a high resistance of the protective tube to vibrations.

A height of the at least one helix structure can increase by half of the tapering of the hollow body. This way a surface of the protective tube is increased resulting in a better heat transfer between the medium and the temperature sensor. Hence, a particularly fast and exact temperature measurement is possible, even with dynamic temperature fluctuations. Furthermore, a high resistance and long service life of the helix structure up to a minimal height can be realized with abrasive media.

A tip of the hollow body formed at the lower end of the hollow body can comprise a flattened plane face which can be produced particularly fast and with low effort.

Two helices can run around the hollow body, wherein one of the helices has a negative pitch and a modulus of the pitch of both helices is preferably equal. This way a particularly good turbulence of the flow of the medium is achieved, whereby a particularly high attenuation of vibrations and a particularly high service life of the protective tube are achieved.

Processes, in which the embodiments of the invention are used, require a high wear resistance and heat resistance of the protective tube. Media introduced into the protective tube are often abrasive or corrosive. In order to increase the service life of the protective tube, the protective tube may be encased by a media resistant jacket. In this context, a further example of the protective tube provides that the hollow body and the at least one helix structure are encased by a plastic resistant to chemicals. This jacket prevents chemical decomposition of the protective tube and the helix structure. The plastic can comprise e.g. CTFE, PTFE, PDE, CFA and/or PFA.

The hollow body and the at least one helix structure can be lined with or made of a metallic alloy and/or a special material, in particular a corrosion resistant nickel base alloy or Monel or a hard alloy on cobalt chromium basis, also referred to as Stellite. The nickel base alloy may comprise different compositions, but comprises nickel as a main component and chromium as the most important secondary component. In addition, the following elements may be comprised: iron, molybdenum, niobium, cobalt, manganese, copper, aluminum, titanium, silicon, carbon, sulfur, phosphor or boron. Monel is a nickel copper alloy and comprises approximately 65% nickel, 33% copper and 2% iron with high tensile strength.

For example, the lining is done using alloys of cobalt and chromium or cobalt chromium molybdenum alloys. The helix structure may be made from such an alloy and be attached to the protective tube by welding or by another material bond. It is also possible to produce the protective tube together with the helix structure in one production process, e.g. by a deep drawing method or an impact extrusion method.

The protective tube can be made of metal. The metal may be an alloy comprising chromium, nickel, molybdenum, and/or manganese. In this context a content of chromium is for example in a range of 13 weight percent (short: weight-%) to 20 weight-%. A content of nickel is for example in a range from 9 weight-% to 15 weight-%. A content of molybdenum is for example in a range from 1 weight-% to 4 weight-%.

In order to further improve the properties of the protective tube, in particular in order to achieve the highest media resistance possible, aside from a standard material such as the high grade steel SS316 a feedstock may be used into which further media resistant metals such as titanium or nickel have been introduced. The feedstock may however also be an alloy such as corrosion proof nickel base alloys or Monel or a hard alloy on cobalt chromium basis.

A gas sample collector for introduction into a process space having a flow directed in a direction comprises a hollow body which is open at its lower end and which comprises an opening at its upper end for taking gas samples.

An inner surface of the hollow body can comprise a cylindrical shape and/or comprises multiple sections respectively having a preferably cylindrical shape, wherein at least one section of an outer contour of the hollow body tapers toward the open lower end. Furthermore, at least in sections, at least one helix structure is arranged on the outer contour and/or at least in sections, at least one helix structure is arranged in the outer contour.

The helix structure provided in addition to the tapering outer contour causes an irregular stall of the flow in an advantageous manner and diminishes or reduces vibration or even rise of an oscillation.

Numerous tests and variations of the protective tube have turned out that only the combination of an outer contour tapering at least in sections and the arrangement of the at least one helix structure result in excellent stability of the gas sample collector with virtually all fluids and in almost all flow situations.

If a vibration should occur anyway, it will be significantly attenuated and cannot lead to tear-off of the gas sample collector due to very low amplitude.

At the same time, the gas sample collector can be produced particularly inexpensively.

The production can be performed for example from solid material by milling, from tubing or by arranging the at least one helix structure on prefabricated gas sample collectors. The helix structure can be right-handed as well as left-handed in this context.

In an exemplary embodiment of the gas sample collector, the outer contour of the hollow body can be conically shaped or conically shaped in sections or a diameter of the outer contour decreases at least in sections toward the open lower end in a nonlinear manner. Such a conical shape or nonlinear decrease of the diameter of the outer contour of the hollow body or the nonlinear decrease of the diameter of the outer contour allows for a particularly high resistance against vibrations on the one hand and a particularly simple and cost-efficient production on the other hand.

The outer contour of the hollow body can be concavely curved in an upper third of the hollow body and thus characterized in a particularly high mechanical stability and a low flow resistance.

An upper section of the outer contour of the hollow body can be devoid of a structure, in particular the helix structure. In this context the upper section of the outer contour is conical or the diameter of the outer contour decreases at least in sections toward the open lower end in a nonlinear manner. A lower section of the outer contour of the hollow body is cylindrical and comprises at least one helix structure arranged on the outer contour and/or at least one helix structure arranged in the outer contour. Such a design has turned out to be particularly resistant to vibrations.

The hollow body may, except for its lower opening and the temperature sensor, have the same features and advantages in an analogue manner as described above in the example embodiments of the protective tube.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
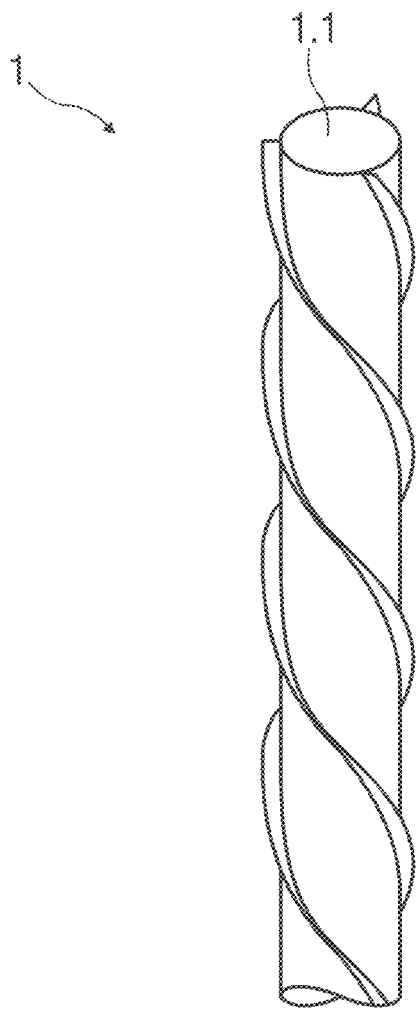
FIG. 1 schematically shows an elongate body according to the state of the art.

FIG. 1 shows an elongate body 1 according to the state of the art as in "R. D. Blevins: Flow-Induced Vibration; Krieger, Florida, 2001 (FIG. (a) Page 18)". The body 1 comprises a cylindrical solid body 1.1 and three helix structures 1.2 to 1.4 surrounding the solid body 1.1 and arranged thereon, for example applied thereon.

Figure 2:
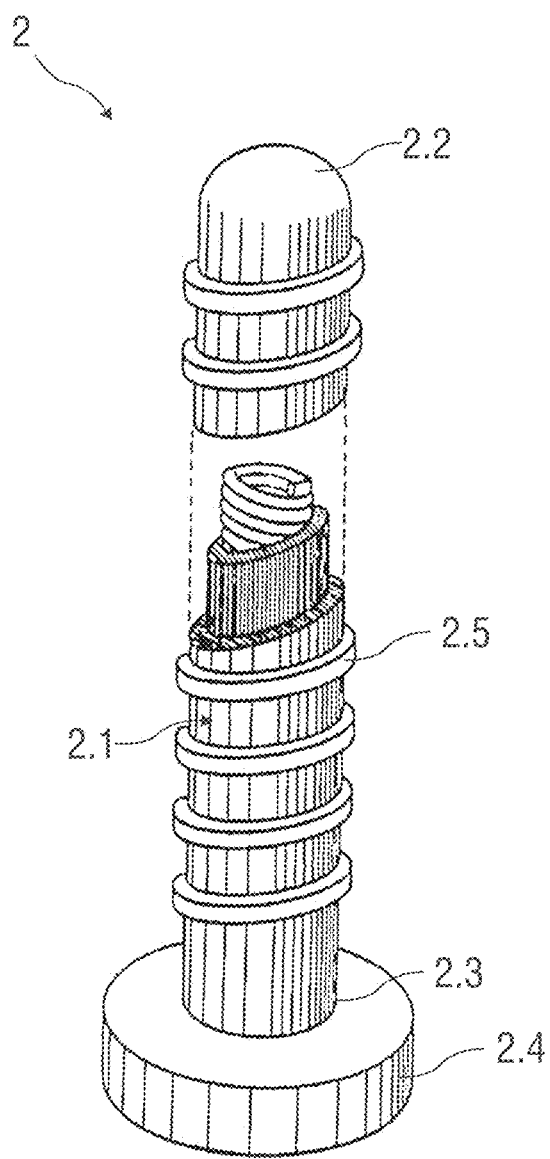
FIG. 2 schematically shows a protective tube according to the state of the art.

FIG. 2 shows a protective tube 2 for a temperature sensor according to the state of the art as in U.S. Pat. No. 4,991,976 A.

Figure 7:
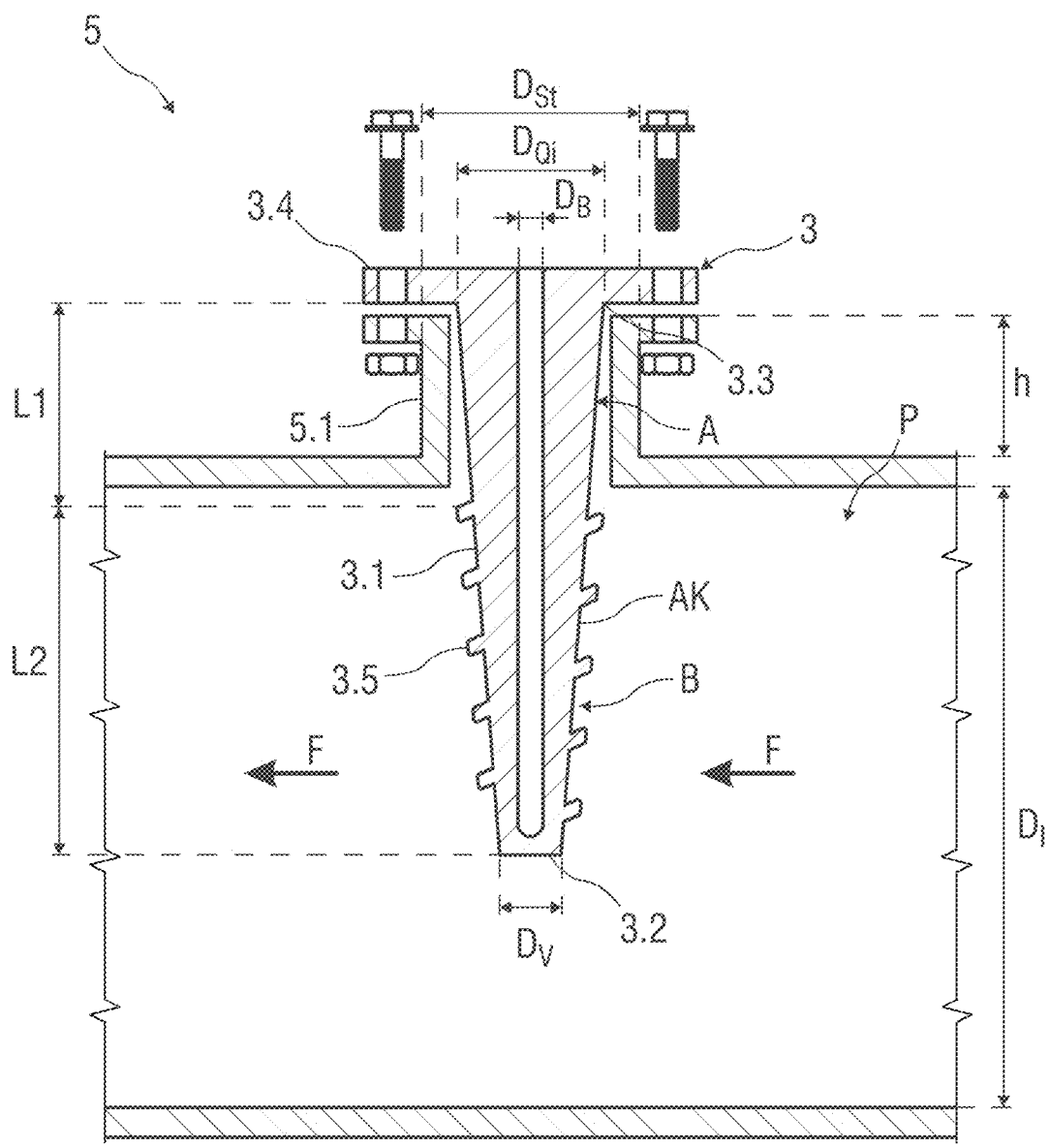

The protective tube 2 is configured for sealed introduction into a process space P having a flow F shown in more detail in FIG. 7 and comprises a hollow body 2.1 which is closed at its lower end 2.2 and at its upper end 2.3 comprises an opening not shown in detail for introducing a temperature sensor. Furthermore, a contour 2.4, in the illustrated embodiment a flange, for sealing to the process space P is arranged at the upper end 2.3. In addition, the protective tube 2 comprises a helix structure 2.5 arranged on, e.g. applied on, an outer contour of the hollow body 2.1.

Figure 3A:
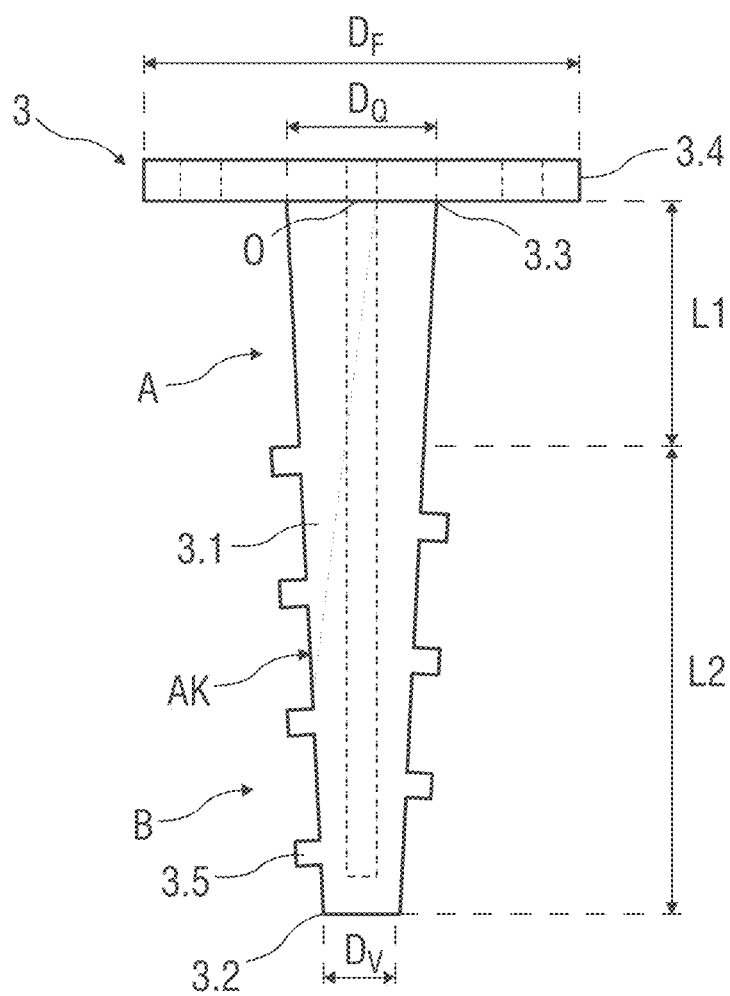
FIG. 3A schematically shows a sectional view of a protective tube.
Figure 3B:
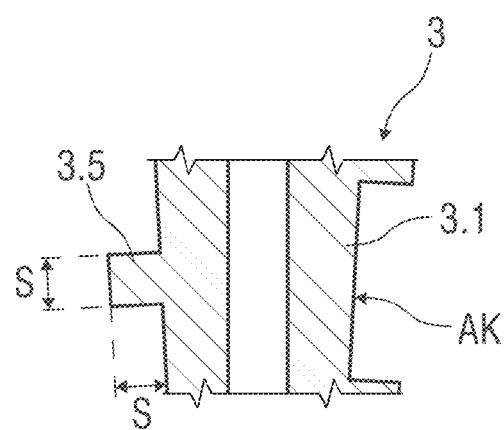
FIG. 3B schematically shows an enlarged detail of the sectional view according to FIG. 3A, FIG. 4A schematically shows a partially transparent view of a protective tube, FIG. 4B schematically shows a partially transparent view of a gas sample collector, FIG. 4C schematically shows a partially transparent view of a protective tube, FIG. 4D schematically shows a detail of a cross section of a protective tube, FIGS. 4E to 4G schematically show cross sections of protective tubes, FIGS. 5A to 5F schematically show details of longitudinal sections of a protective tube, FIGS. 6A to 6E schematically show details of longitudinal sections of a protective tube, FIGS. 6F to 6H schematically show enlarged details of longitudinal sections of a protective tube in the area of a helix structure, FIG. 7 schematically shows a sectional view of a system having a process space and a protective tube protruding into the process space, FIG. 8 schematically shows a perspective view of a gas sample collector, FIGS. 9A to 9C schematically shows a protective tube, FIG. 9D schematically shows a partially transparent view of a protective tube, FIG. 9E schematically shows a partial section of a protective tube, FIG. 9F schematically shows a cross section of the protective tube according to FIG. 9E, FIG. 10A schematically shows a perspective view of a detail of a gas sample collector, FIG. 10B schematically shows a protective tube, FIG. 10C schematically shows a detail of a protective tube, FIG. 11A schematically shows a perspective view of a detail of a protective tube, FIG. 11B to 11D schematically show cross sections of protective tubes, and FIGS. 12A to 12D schematically show a cross section of a protective tube.

FIG. 3A shows a sectional view of an example embodiment of a protective tube 3 according to the invention. FIG. 3B shows an enlarged detail of the sectional view according to FIG. 3A.

The protective tube 3 is configured for sealed introduction into a process space P having a flow F shown in more detail in FIG. 7 and comprises a hollow body 3.1 which is closed at its lower end 3.2 and at its upper end 3.3 comprises an opening O for introducing a temperature sensor not shown.

Furthermore, a contour 3.4, in the illustrated embodiment a flange, for sealing to the process space P is arranged at the upper end 3.3. In this context, the contour 3.4 exhibits a diameter $D_F$.

Additionally, the protective tube 3 comprises a helix structure 3.5 applied onto an outer contour AK of the hollow body 3.1 or integrally formed with the hollow body 3.1 and protruding therefrom. In this context, the helix structure 3.5 exhibits a square cross section.

The hollow body 3.1 is configured to be cylindrical inwardly. An outer contour of the hollow body 3.1 tapers toward the closed lower end 3.2. The tapering is for example conical. Likewise, the tapering may be realized by non-linear decrease of a diameter of the outer contour AK toward the closed lower end 3.2 at least in sections.

For example, the hollow body 3.1 exhibits a diameter $D_Q$ of approximately 20 mm to 50 mm, in particular 25 mm at its upper end 3.3, also referred to as the root of the protective tube 3, and exhibits a diameter $D_v$ of approximately 12 mm to 30 mm, in particular 16-19 mm, at its tip, i.e. the lower end 3.2.

In an example embodiment of the protective tube 3, an upper section A of the hollow body 3.1, also referred to as an upper retaining section, is configured without a structure, in particular devoid of the helix structure 3.5. For example, the upper section A exhibits a length L1 of approximately 50 mm to 250 mm or 90 mm to 125 mm, in particular 100 mm to 125 mm.

A lower section B which is provided with the helix structure 3.5, exhibits for example a length L2 of 200 mm to 300 mm or 500 mm or, if the protective tube 3 is applied in gas pipelines with large diameter, up to 1400 mm.

A length ration of the length L1 relative to the length L2 is for example 1:2 or 1:3 or is smaller for special applications.

The helix structure configured with a square cross section exhibits for example an edge length S of 2.5 mm.

In an example embodiment, the edge length S reduces starting from the root of the protective tube 3 toward its tip.

For example, the edge length S and thus a material thickness of the helix structure equals a 0.1-fold to 0.15-fold of a diameter of the hollow body 3.1 present at the respective position of the helix structure 3.5 according to:

$$S = 0.1 \ldots 0.15 * D \quad (1)$$

with: D=diameter of the hollow body 3.1.

Figure 4A:
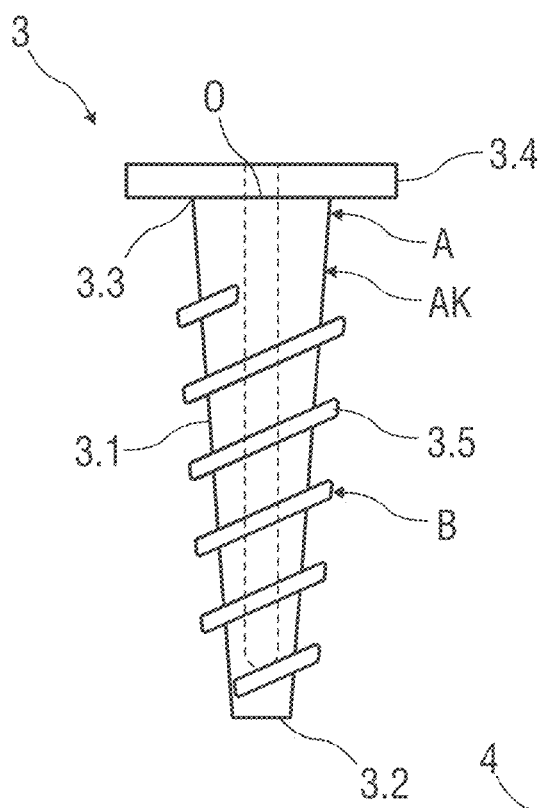

FIG. 4A shows a conically tapering protective tube 3.

Figure 4B:
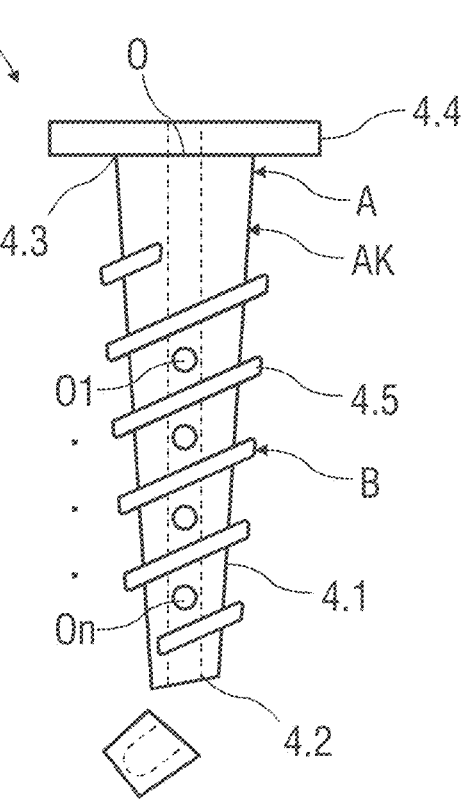

FIG. 4B shows a gas sample collector 4, comprising a hollow body 4.1 which is open at its lower end 4.2 toward a gas sample collection point and which comprises an opening O at its upper end 4.3 for taking gas samples.

Furthermore, a contour 4.4, in the illustrated embodiment a flange, for sealing to the process space P is arranged at the upper end 4.3.

Additionally, the gas sample collector 4 comprises a helix structure 4.5 applied onto an outer contour AK of the hollow body 4.1 or integrally formed with the hollow body 4.1 and protruding therefrom.

The hollow body 4.1 is configured cylindrical inwardly. An outer contour of the hollow body 4.1 tapers toward the open lower end 4.2. The tapering is for example conical. Likewise, the tapering may be realized by non-linear decrease of a diameter of the outer contour AK toward the open lower end 4.2 at least in sections.

In addition, the hollow body 4.1 may comprise multiple openings O1 to On along an imaginary line toward a gas sample collection point. In this context the imaginary line runs starting from the lower end 4.2 to the upper end 4.3 of the gas sample collector 4 such that the protective tube 4.1 is designed similar to a recorder, i.e. its outer appearance resembles a recorder.

The further characteristics of the gas sample collector 4 correspond in an anlagous manner to the description referring to FIGS. 3A and 3B.

Figure 4C:
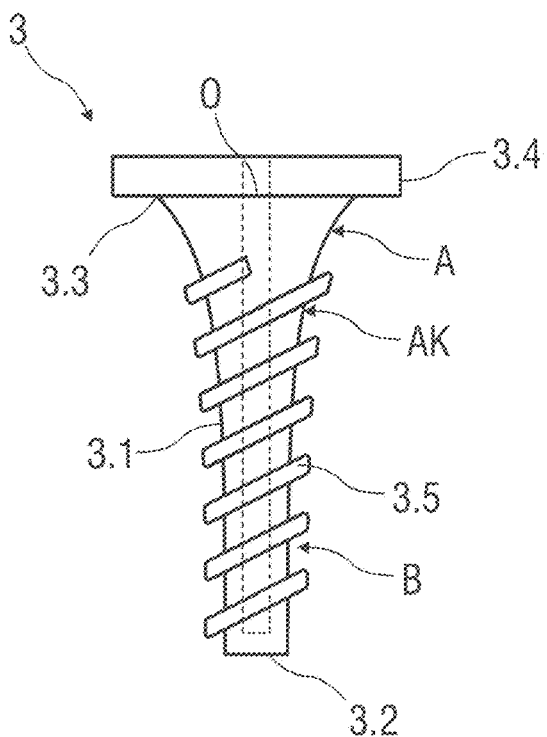

FIG. 4C shows a tapering protective tube 3, wherein the tapering occurs starting from the root of the protective tube 3 in a radius logarithmically increasing toward the tip. I.e. the tapering is realized by a non-linear decrease of a diameter of the outer contour AK toward the closed lower end 3.2.

Figure 4D:
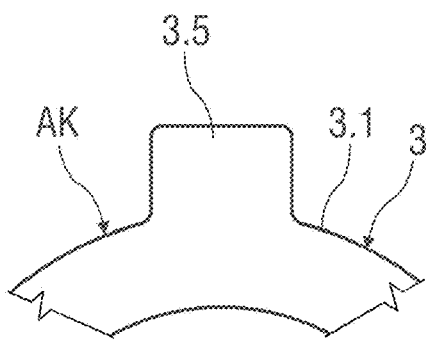

FIG. 4D shows a detail of a cross section of a protective tube 3, wherein with a radius on a base of the helix structure 3.5 adjoining the hollow body 3.1 merges with the hollow body 3.1 and wherein upper edges facing away from the hollow body 3.1 are broken with a radius of, e.g. 0.1 mm.

Sharp edges have turned out to be advantageous in the flow test; however, injuries shall be prevented during assembly, hence the edges are for example removed in the range of 0.1 mm.

Figure 4E:
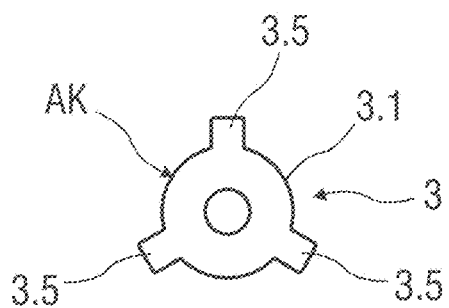
Figure 4F:
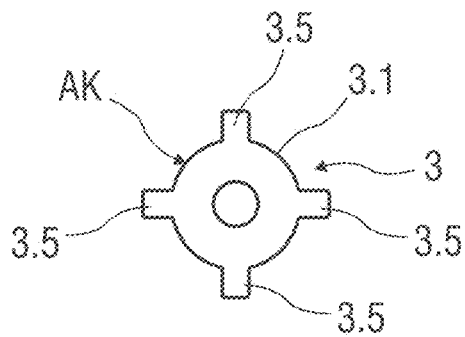

FIGS. 4E and 4F show cross sections of protective tubes 3. Other than in the embodiment shown in FIG. 3A, the helix structure 3.5 is configured as a triple helix (FIG. 4E) or a quadrule helix (FIG. 4F).

Figure 4G:
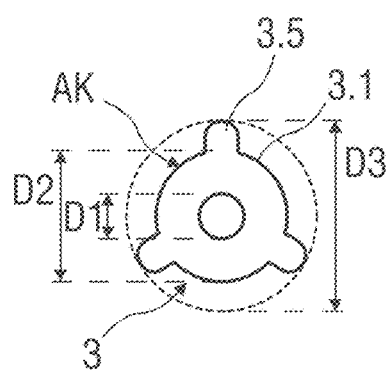

FIG. 4G shows a cross section of a protective tube 3 having a helix structure 3.5 configured as a triple helix having highly rounded upper edges.

Herein, a cylindrical inner section of the hollow body 3.1 exhibits a diameter D1, the outer contour AK of the hollow body 3.1 exhibits a diameter D2 and an imaginary cirle surrounding the helix structure 3.5 exhibits a diameter D3.

This enveloping diameter D3 results for example as:

$$D3 = (2*0.12*D2) + D2 \qquad (2)$$

FIG. 5 shows a conically tapering protective tube 3 having a helix structure 3.5 in a half sectional view, wherein, starting from the tip of the protective tube 3, the edge length S, i.e. a material thickness of the helix structure 3.5, i.e. a height of the helix structure radially starting from the outer contour AK of the hollow body 3.1, decreases toward the root of the protective tube 3.

Figure 5A:
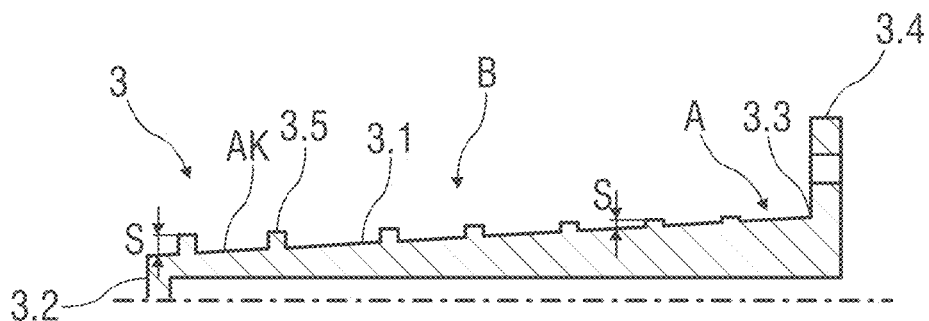
Figure 5B:
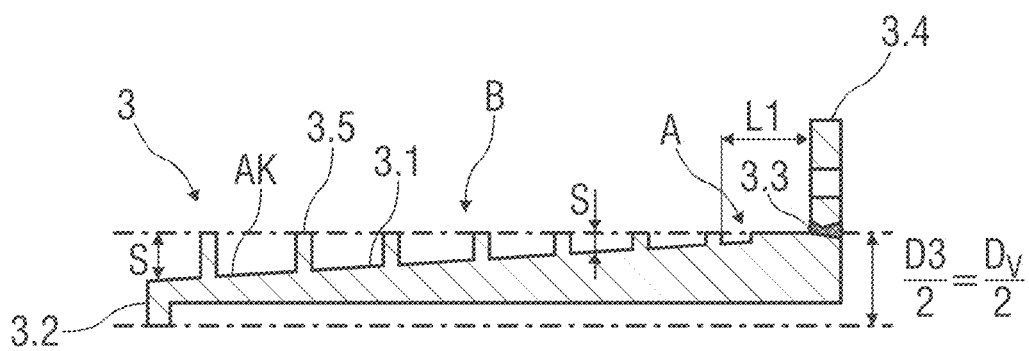

FIG. 5B shows a conically tapering protective tube 3 having a helix structure 3.5 in a half sectional view, wherein, as opposed to the protective tube 3 shown in FIG. 5A, a diameter D3 of the helix structure 3.5 is constant over the entire length of its layout.

In an exemplary embodiment of the protective tube 3, the tapered off upper section A, which is for example generated by producing the protective tube 3 on a turning machine, exhibits an outer diameter for mounting in a chuck and for welding in into a contour 3.4, which is for example configured as a flange, and is devoid of the helix structure 3.5. Herein, the section A exhibits a maximum diameter $D_v$ of a blank which simply remains unmachined and thus creates a thicker socket section.

Figure 5C:
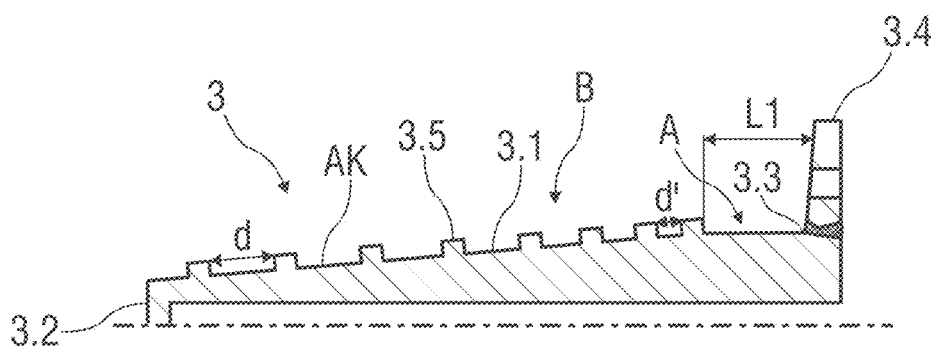

FIG. 5C shows a conically tapering protective tube 3 having a helix structure 3.5 in a half sectional view, wherein, as opposed to the protective tube 3 shown in FIG. 5A, the edge length S, i.e. a material thickness of the helix structure 3.5, i.e. a height of the helix structure 3.5 radially starting from the outer contour AK of the hollow body 3.1, is constant over the entire length of its layout; however a distance d, d' between individual helix windings of the helix structure 3.5 decreases toward the root of the protective tube 3.

In an exemplary embodiment of the protective tube 3, the tapered off upper section A, which is for example generated by producing the protective tube 3 on a turning machine, exhibits an outer diameter for mounting in a chuck and for welding in into a contour 3.4, which is for example configured as a flange, and is devoid of the helix structure 3.5.

Figure 5D:
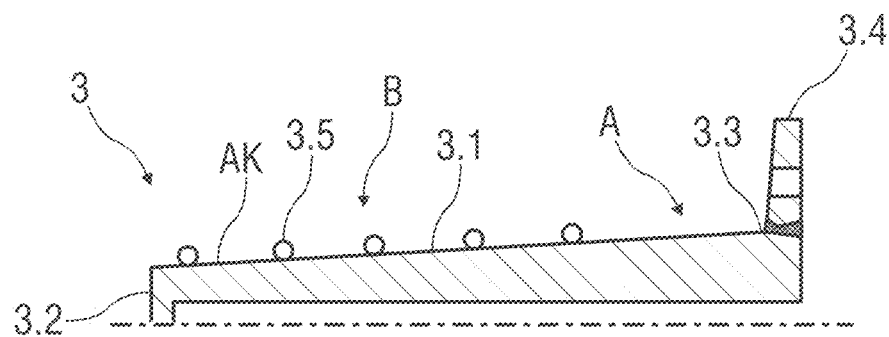

FIG. 5D shows a conically tapering protective tube 3 in a half sectional view with a helix structure 3.5 having a uniformly round cross section and welded onto the outer contour AK of the hollow body as a round wire.

Figure 5E:
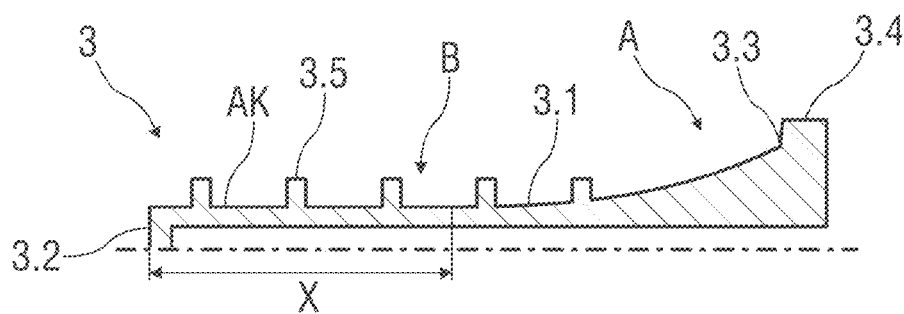

FIG. 5E shows a tapering protective tube 3 in a half sectional view, wherein the outer contour AK of the hollow body 3.1 exhibits an ascending curve progression with a radius decreasing toward the root of the protective tube 3 and wherein a section X is cylindrical or only marginally conical. Herein, the tapering occurs at least in sections by non-linear decrease of the diameter of the outer contour AK toward the closed loser end 3.2.

Figure 5F:
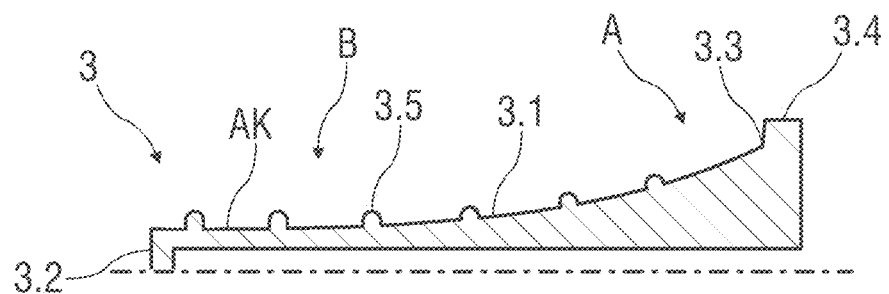

FIG. 5F shows a tapering protective tube 3 in a half sectional view having a logarithmically ascending curve progression toward the root of the protective tube 3, wherein the helix structure 3.5 exhibits a half-round cross section. I.e., the tapering occurs by non-linear decrease of the diameter of the outer contour AK toward the closed lower end 3.2.

The aforementioned embodiments assume that the protective tube 3 is formed from a solid body by shape cutting. Likewise, it is possible to produce at least the hollow body 3.1 together with the helix structure 3.5 in a deep drawing process or an impact extrusion process. Likewise, the contour 3.4 may be configured as a homogenous component with the hollow body 3.1 or may be subsequently attached thereon, e.g. by welding.

In the following embodiments of the protective tube 3, the hollow body 3.1 may likewise be formed from a solid body by shape cutting. It is possible to form the respective helix structure 3.5 in advance and to then apply it on the outer contour AK of the hollow body 3.1, e.g. by welding. Likewise, the contour 3.4 may be configured as a homogenous component with the hollow body 3.1 or may be subsequently attached thereon, e.g. by welding.

FIGS. 6A to 6E respectively show a half longitudinal section of a protective tube 3 with different implementations of a helix structure 3.5.

Figure 6A:
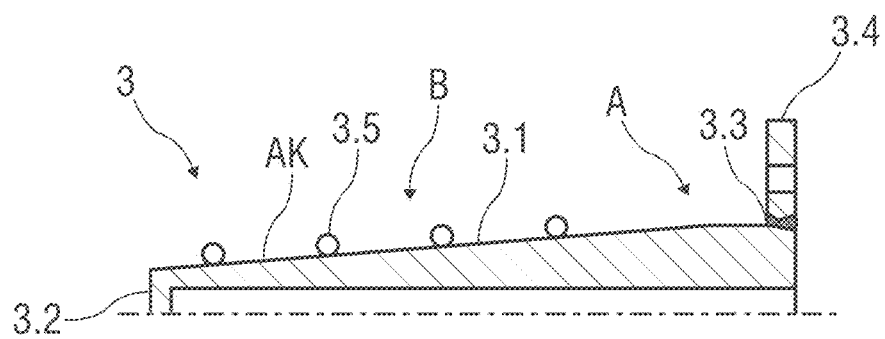
Figure 6B:
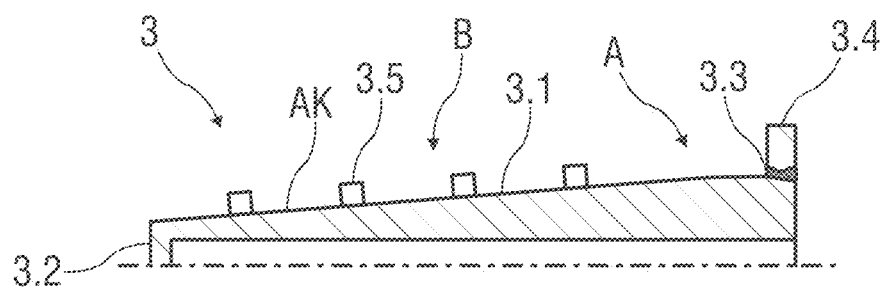
Figure 6C:
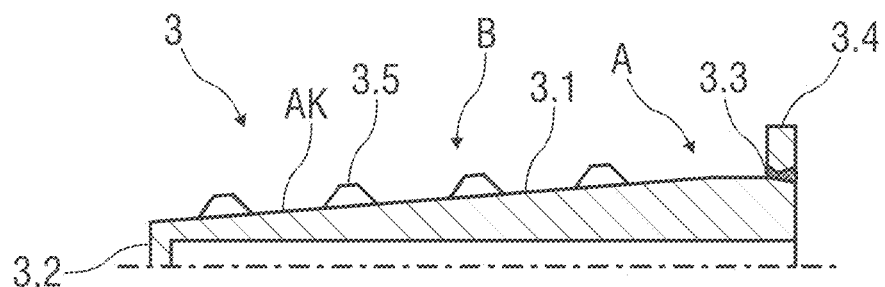
Figure 6D:
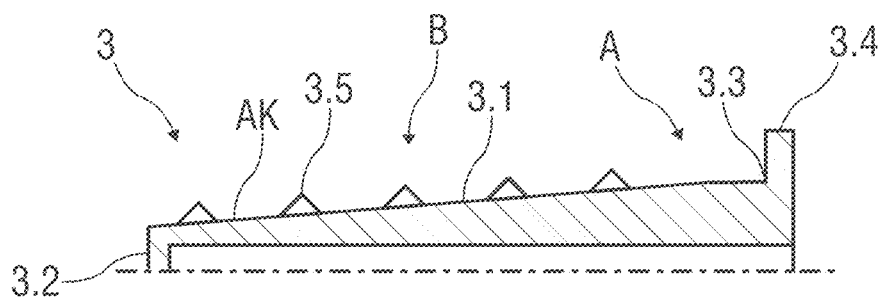
Figure 6E:
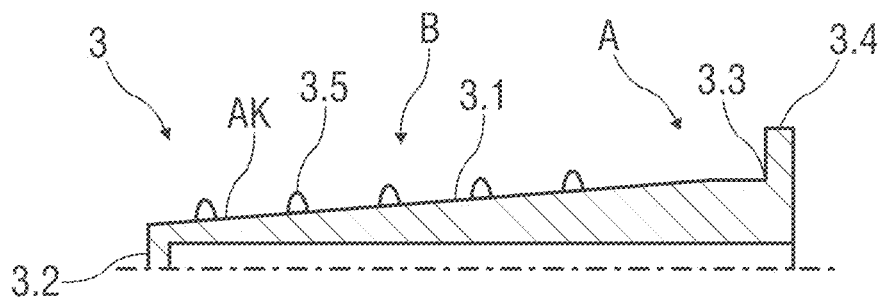

Herein, the protective tube 3 in FIG. 6A exhibits a helix structure 3.5 having a round cross section, the protective tube 3 in FIG. 6B exhibits a helix structure 3.5 having a square cross section, the protective tube 3 in FIG. 6C exhibits a helix structure 3.5 having a trapezoid cross section, the protective tube 3 in FIG. 6D exhibits a helix structure 3.5 having a triangular cross section, and the protective tube 3 in FIG. 6E exhibits a helix structure 3.5 having a rounded off cross section.

Figure 6F:
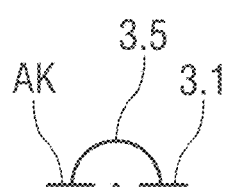
Figure 6G:
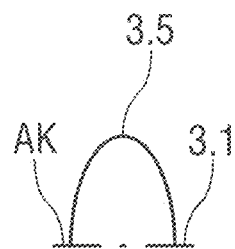
Figure 6H:
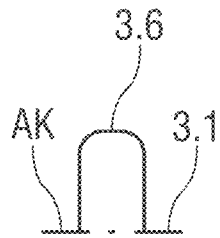

FIGS. 6F to 6H show enlarged details of longitudinal sections of a protective tube 3 in the area of a helix structure 3.5, wherein the protective tube 3 according to FIG. 6F exhibits a helix structure 3.5 having a half-round cross section, the protective tube 3 according to FIG. 6G exhibits a helix structure 3.5 having a highly rounded cross section, and the protective tube 3 according to FIG. 6H exhibits a helix structure 3.5 having a highly rounded cross section.

FIG. 7 shows a sectional view of a system 5 having a tubular process space P and a conically tapering protective tube 3 protruding into the process space P.

Herein, the protective tube 3 comprises a contour 3.4 configured as a flange, by means of which the protective tube 3 can be attached in a media tight manner on a flange socket 5.1 of the process space P.

The flange socket 5.1, also referred to as stand off or nozzle, exhibits a height h of 4" to 8", e.g. 6" at a diameter $D_{St}$ of 1.5" or 2".

In this range of the height h the protective tube 3, i.e. the outer contour AK of the hollow body 3.1 on the length L1 in the section A, remains at least essentially or for the most part devoid of the helix structure 3.5 and protrudes with its lower section B, which has the helix structure 3.5, with a length L2 up into the middle third of the process space P which exhibits a diameter $D_i$. Herein, the tip of the protective tube 3 protrudes preferably up into a middle or a middle third of the tubular process space P.

The diameter $D_Q$ at the root of the protective tube 3 is for example 1", wherein the protective tube 3 exhibits a diameter $D_v$ of ¾" at its lower end, i.e. at the tip. An internal bore for receiving the temperature sensor has for example a diameter $D_B$ of 0.26".

Figure 8:
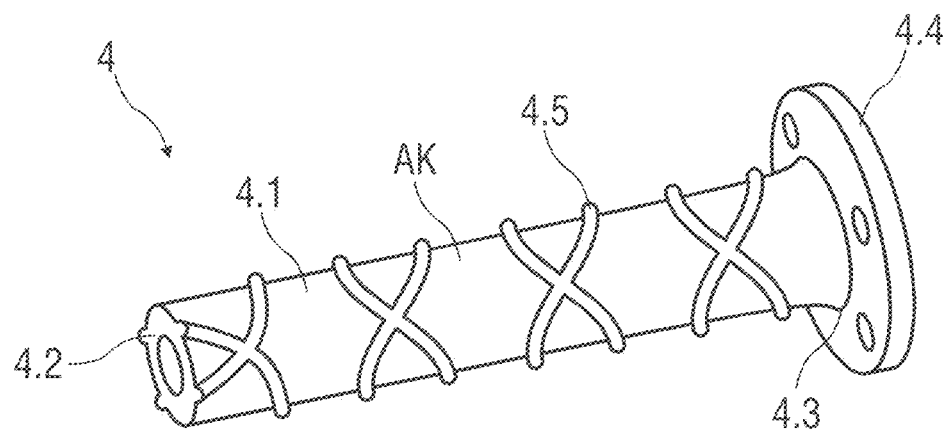

FIG. 8 shows a tapering gas sample collector 4, also referred to as quill-style, in a perspective view, wherein the helix structure 4.5 comprises multiple mutually overlapping helices. I.e., sections of multiple helices are arranged vertically offset on the outer contour AK of the hollow body 4.1.

FIGS. 9A to 9F show various embodiments of a protective tube 3.

Figure 9A:
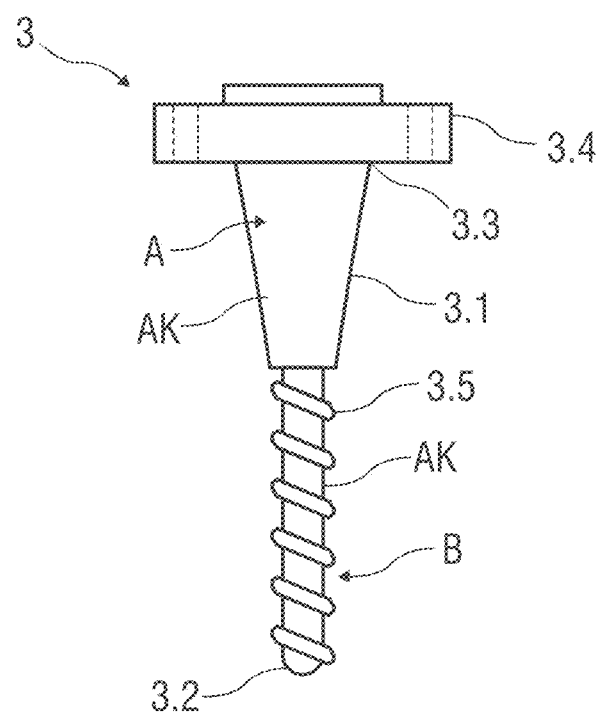

Herein, the conical upper section A according to FIG. 9A merges with a step into the lower cylindrical section B.

Figure 9B:
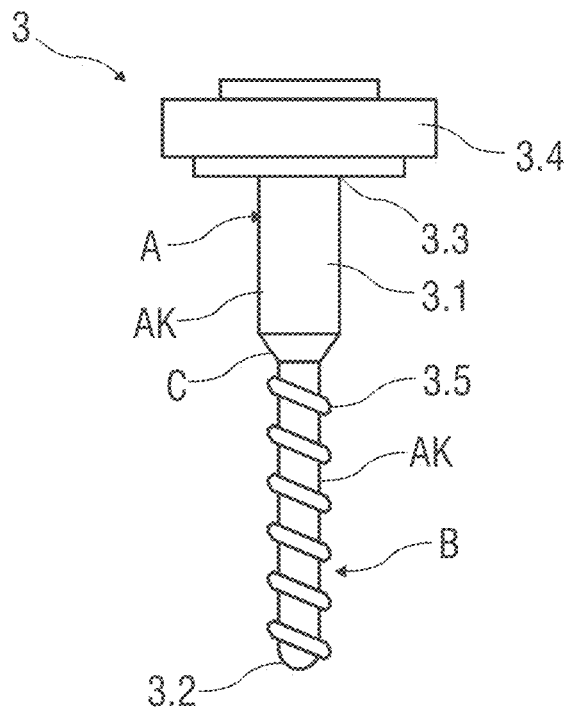

According to FIG. 9B, a cylindrical upper section A merges by means of a conical section C configured as a transitional section into the lower cylindrical section B. Herein, the upper cylindrical section A is in particular a maximum diameter $D_v$ of a section of a blank which remains unmachined and thus creates an upper socket section.

Figure 9C:
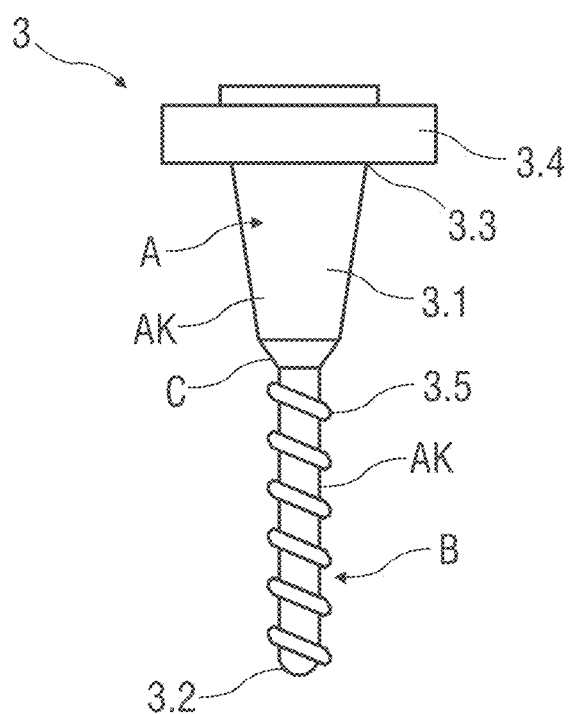

According to FIG. 9C, the conical upper section A merges by means of a conical further section C configured as a transitional section into the lower cylindrical section B.

Figure 9D:
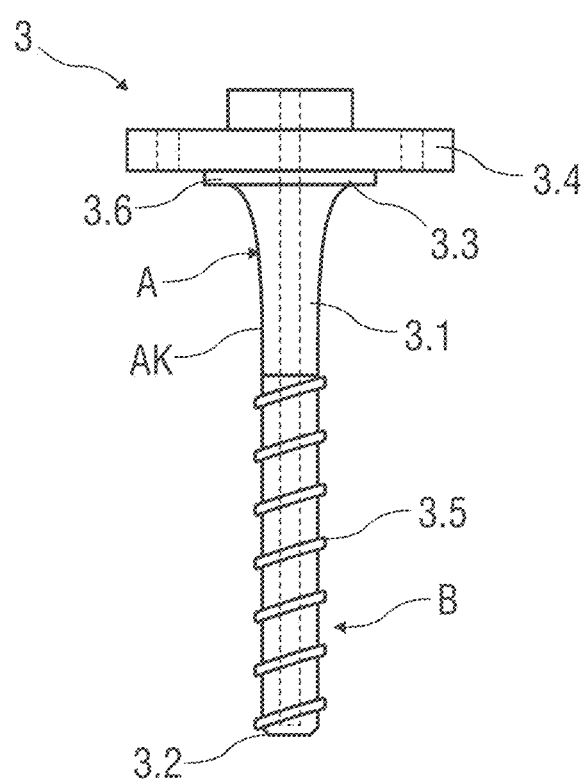

According to FIG. 9D a collar 3.6 is arranged in particular at the upper flange-shaped contour 3.4, wherein starting from the collar 3.6 a radius transition occurs onto the upper section A, whose tapering is configured by non-linear decrease of the diameter of the outer contour AK toward the closed lower end 3.2. A transition between the upper section A and the cylindrical lower section B is in particular continuous and without forming an edge as a smooth transition or with a radius transition in a way not shown in detail. In an example, the upper section A can be conical.

The inner bore for the temperature sensor is configured cylindrical or steplike cylindrical, wherein the inner bore may also be embodied with a step. Likewise, multiple steps are possible, in particular in the lower section, wherein the tip locates at the lower end 3.2 comprises a flattened plane face. Alternatively, the tip may also be a sphere tip according to FIGS. 9A to 9C or a different tip.

Figure 9E:
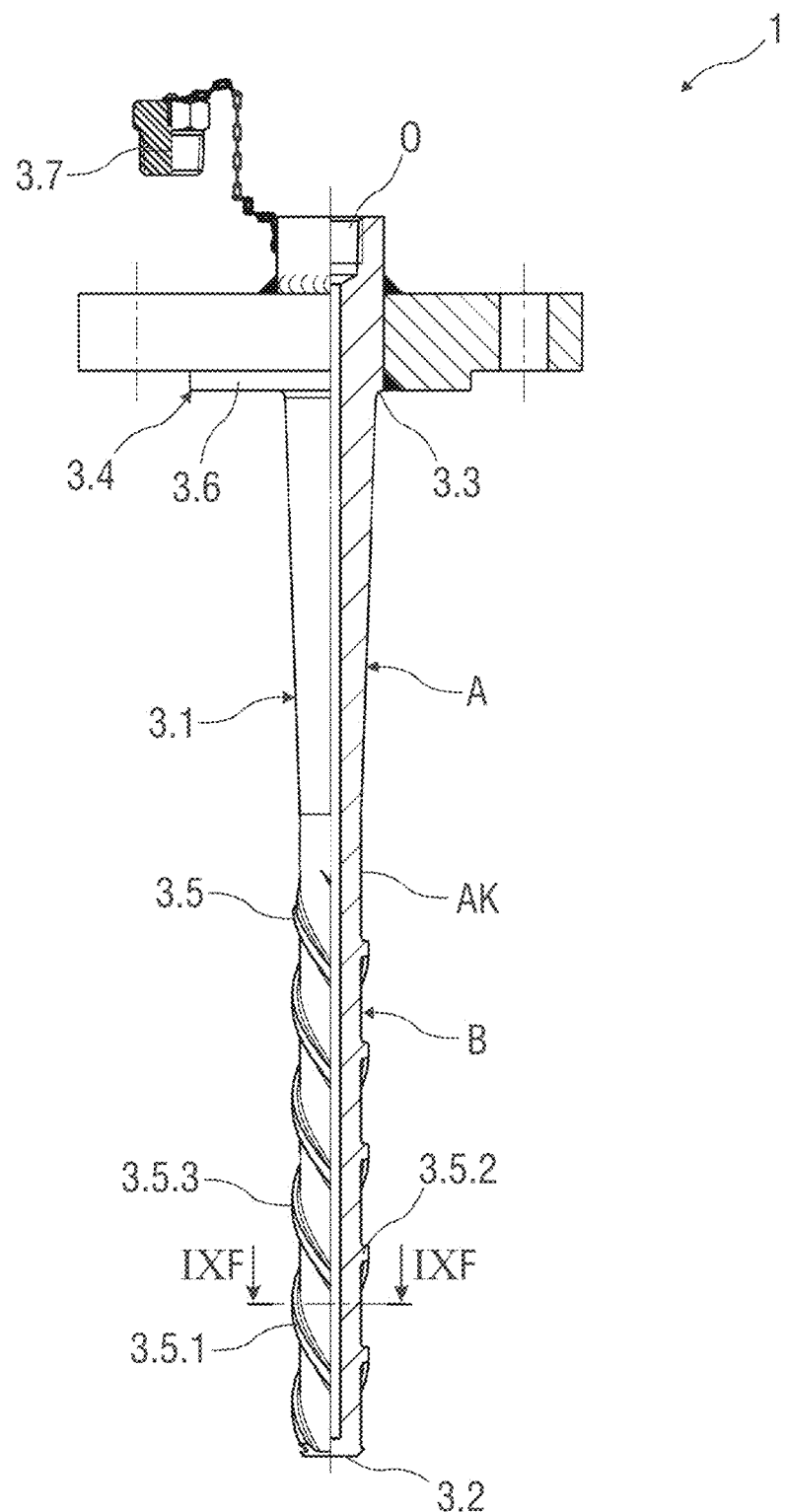
Figure 9F:
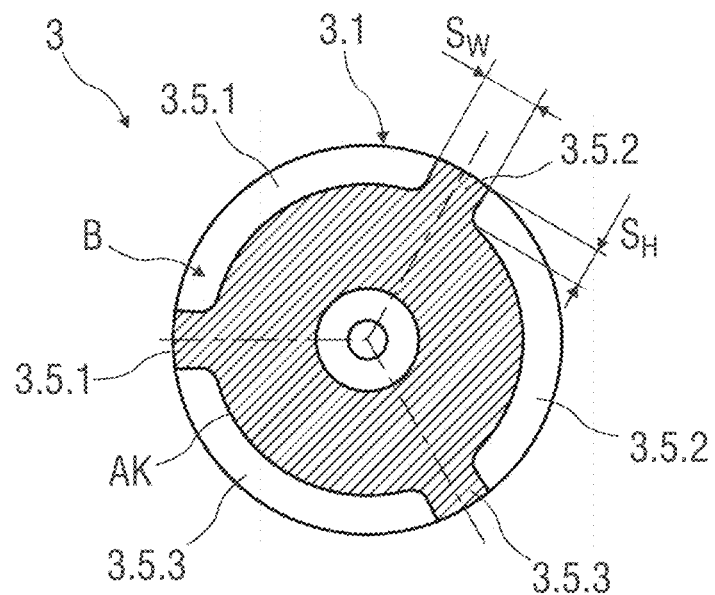

FIG. 9E schematically shows a partial section of an exemplary embodiment of a protective tube 3. FIG. 9F schematically shows a cross section of this protective tube 3.

The protective tube 3 comprises a hollow body 3.1 which is closed at its lower end 3.2 and comprises an opening O at its upper end 3.3 for introducing a temperature sensor and comprises a contour 3.4 configured as a flange at its upper end 3.3 for sealing to a process space P. The flange is for example integrally formed with the protective tube 3 or subsequently attached at the upper end, e.g. welded. In an exemplary embodiment, a closure element 3.7 is provided for closing the opening O.

Herein, the hollow body 3.1 is cylindrical inwardly and an outer contour AK of the hollow body 3.1 tapers toward the closed lower end 3.2. The hollow body 3.1 exhibits a diameter of 20 mm to 30 mm at its root formed at its upper end 3.3 and exhibits a diameter of 16 mm to 25 mm, in particular 19 mm, at its tip formed at its lower end 3.2.

Furthermore, a collar 3.6 is arranged at the upper flange-shaped contour 3.4, wherein starting from the collar 3.6 a radius transition occurs onto an upper section A of the hollow body 3.1. The radius transition exhibits for example a radius of 2.5 mm.

The upper section A of the outer contour AK of the hollow body 3.1 is conically formed and devoid of a structure, in particular devoid of the helix structure 3.5. Herein, the upper conical section A of the outer contour AK exhibits a cone angle of 1° to 7°, in particular 2° to 6°, in particular 3° to 5° degrees relative to a central axis.

A lower section B of the protective tube 3 is configured cylindrical, wherein a helix structure 3.5 is arranged on an outer contour AK of the hollow body 3.1 in the lower section B.

The helix structure 3.5 is configured as a so called triple helix, wherein individual windings, i.e. individual helices 3.5.1 to 3.5.3 of the helix structure 3.5 are offset by 120° relative to each other. Herein, the helices 3.5.1 to 3.5.3 exhibit a rectangular cross section with an edge length $S_H$ defining their height and an edge length $S_W$ defining their width.

At a base adjoining the hollow body 3.1 the helices 3.5.1 to 3.5.3 merge with a radius into the hollow body 3.1, and upper edges facing away from the hollow body 3.1 are broken with a radius of e.g. 0.1 mm.

A transition between the upper conical section A and the cylindrical lower section B is in particular continuous and without forming an edge as a smooth transition or with a radius transition in a way not shown in detail.

Figure 10A:
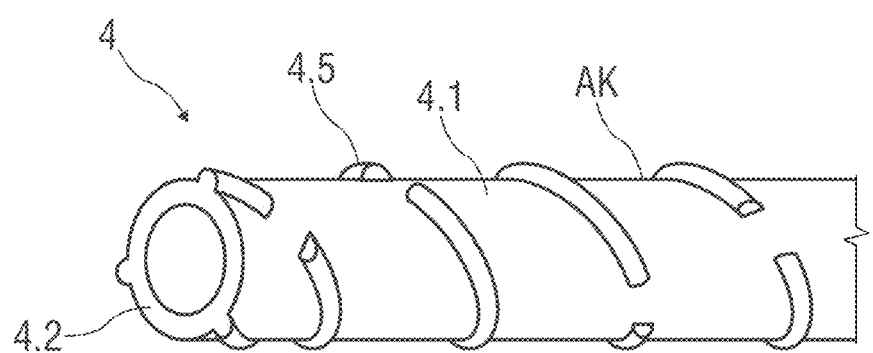

FIG. 10A shows a perspective view of a detail of a gas sample collector 4 having an interrupted helix structure 4.5. The helix structure 4.5 is for example realized by interrupting a continuous helix structure 3.5.

Figure 10B:
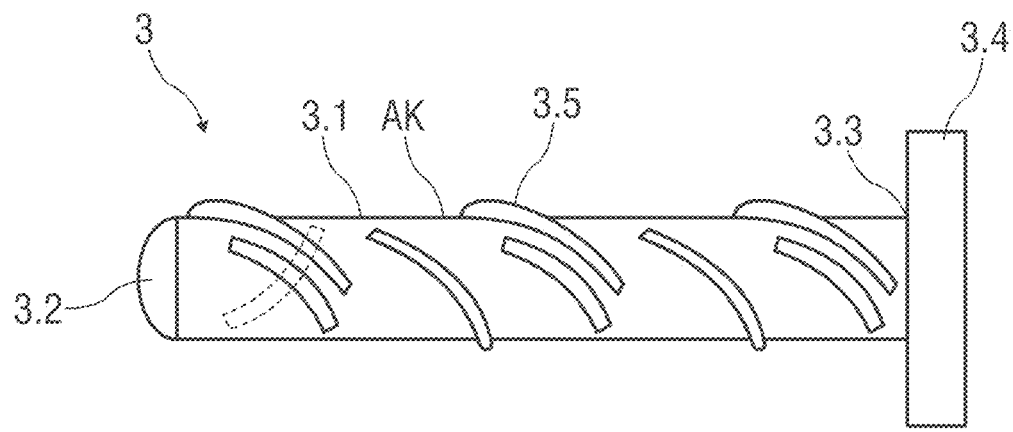

FIG. 10B shows a perspective view of a detail of a protective tube 3 having an interrupted helix structure 3.5. The helix structure 3.5 is for example realized by forming or arranging multiple helix elements on the outer contour AK.

Figure 10C:
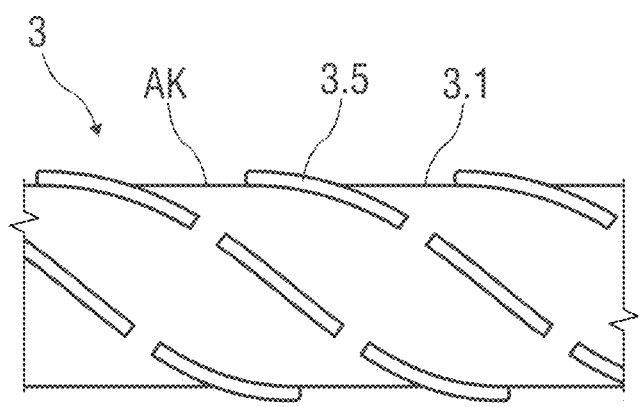

FIG. 10C shows a perspective view of a detail of a protective tube 3 having an interrupted helix structure 3.5. The helix structure 3.5 is for example realized by interrupting a continuous helix structure 3.5.

Figure 11A:
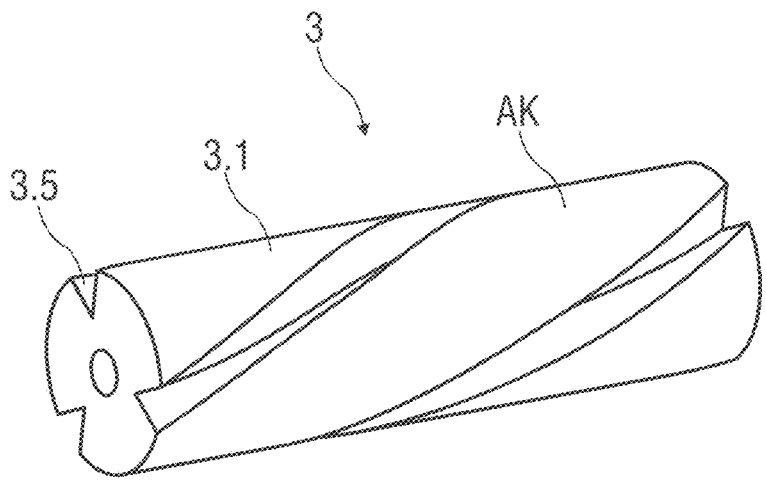

FIG. 11A shows a detail of a protective tube 3 having a helix structure 3.5 configured as a triple helix. Other than in the protective tubes 3 or gas sample collectors 4 having the helix structures 3.5, 4.5 shown in the preceding figures, the helix structure 3.5 is presently neither applied onto the hollow body 3.1, 4.1 nor formed as an integral part thereof and protruding outward therefrom, but introduced into the outer contour AK of the hollow body 3.1.

Figure 11B:
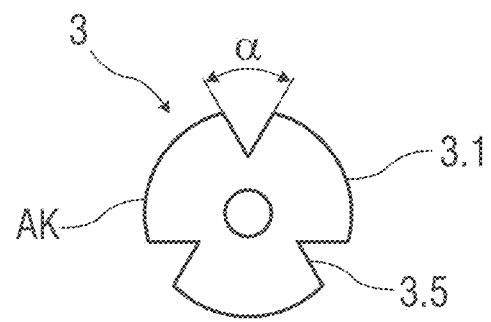
Figure 11C:
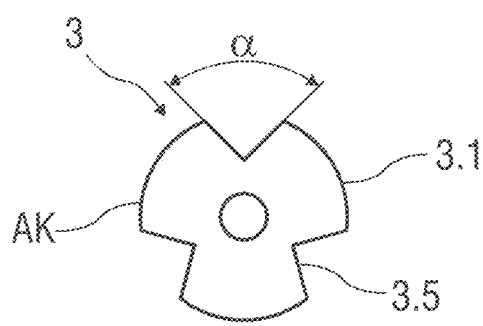
Figure 11D:
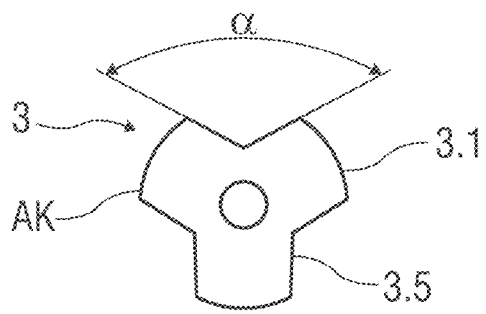

Herein, the helix structure 3.1 exhibits a triangular cross section whose angle α may be variably chosen depending on a desired impact on the flow F according to FIGS. 11B to 11C.

Figure 12A:
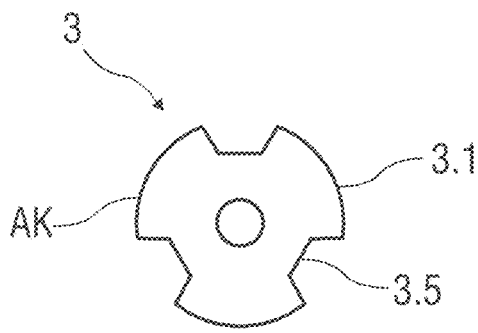
Figure 12B:
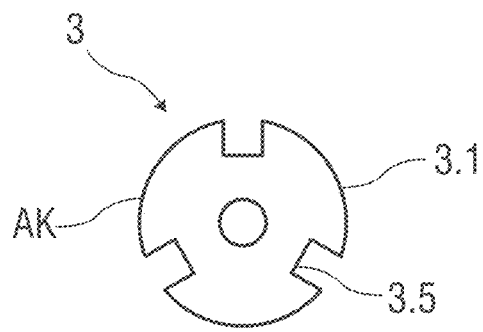
Figure 12C:
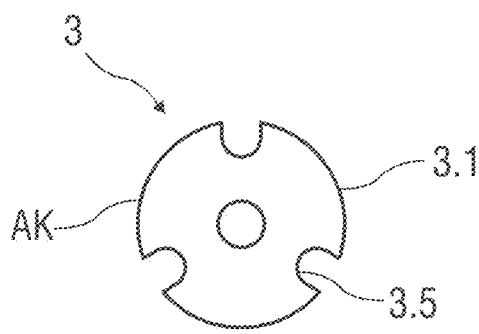
Figure 12D:
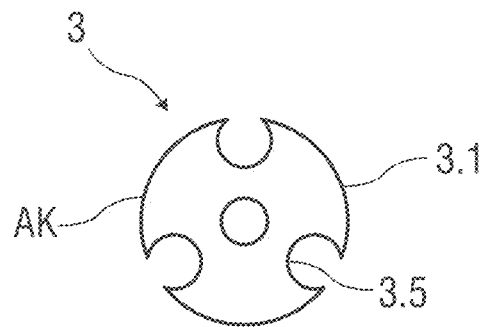

Deviating from the shown triangular cross section of the helix structure 3.5, the helix structure 3.5 may exhibit different cross sections according to FIGS. 12A to 12D, e.g. a trapezoid cross section (FIG. 12A), a square cross section (FIG. 12B), a rounded cross section with a large opening (FIG. 12C) or a rounded cross section with a smaller opening (FIG. 12D).

Moreover, for further stabilizing or for increasing the stability of the protective tube 3 and the gas sample collector 4, introduction of material stress into the surface for improving vibration resistance is applicable for all illustrated embodiments of the protective tube 3 and the gas sample collector 4. For this purpose, the surface is compacted preferably in the upper section A by roll compacting, shot blasting or other smoothing or likewise by so called laser peening. This demonstrably serves for increasing the stability of the protective tube 3 or the gas sample collector 4. This compacting is demonstrable in an etched grinding pattern and also superficially visible by a modified structure.

In an example embodiment of the protective tube 3 and the gas sample collector 4, the hollow body 3.1 may, aside from the difference of the lower opening and the temperature sensor, exhibit the same features and advantages in an analogous way as described above in the possible embodiments of the gas sample collector 4 and the protective tube 3, respectively.

The invention is not limited to the preceding detailed embodiments. It may be modified within the scope of the subsequent claims. Likewise, individual aspects from the dependent claims may be combined with each other.

What is claimed is:

1. A protective tube for sealed introduction into a process space having a flow directed in a direction, the protective tube comprising:
    a hollow body;
    a closed lower end;
    an upper end with an opening configured to introduce a temperature sensor; and
    a contour formed at the upper end, the contour configured for sealing to a process space,
    wherein the hollow body has an outer contour and an inner surface,
    wherein the inner surface comprises a cylindrical shape,
    wherein at least one section of the outer contour tapers toward the closed lower end,
    wherein at least one helix structure is provided, the helix structure being arranged on the outer contour at least in sections or arranged in the outer contour at least in sections,
    wherein the outer contour has an upper section devoid of a helix structure,
    wherein the upper section is conical or provided with a diameter decreasing toward the closed lower end in a nonlinear continuous manner,
    wherein the outer contour has a lower section, wherein the lower section is cylindrical and comprises at least one helix structure,
    and wherein the helix structure is arranged on the outer contour or arranged in the outer contour.

2. The protective tube according to claim 1, wherein a length ratio of the upper section to the lower section of the outer contour is 1:2.0 to 1:3.5 or 1:2.5 to 1:3.0.

3. The protective tube according to claim 1, wherein the upper section and the lower cylindrical section of the outer contour merge, and wherein the merging is without forming an edge.

4. The protective tube according to claim 1, wherein the upper section of the outer contour has a length of 70 mm to 200 mm, a length of 95 mm to 120 mm, or a length of 100 mm.

5. The protective tube according to claim 1, wherein the upper section of the outer contour exhibits a cone angle of 1° to 7°, a cone angle of 2° to 6°, or a cone angle of 3° to 5° degrees relative to a central axis.

6. The protective tube according to claim 1, wherein the hollow body comprises a root formed at its upper end and a tip formed at its lower end, wherein the hollow body exhibits a diameter of 20 mm to 30 mm at its root or a diameter of 16 mm to 25 mm, or 19 mm at its tip.

7. The protective tube according to claim 1, wherein the upper section of the hollow body is devoid of the at least one helix structure and exhibits a length of 100 mm to 125 mm.

8. The protective tube according to claim 1, wherein a further section is arranged between the upper section of the hollow body and the lower section of the hollow body having the at least one helix structure, and wherein the further section is configured as a conical transitional section or transitional section with a diameter decreasing nonlinear.

9. The protective tube according to claim 1, wherein the at least one helix structure is interrupted at several places.

10. The protective tube according to claim 1, wherein the at least one helix structure is configured as a triple helix or a quadruple helix.

11. The protective tube according to claim 1, further comprising sections of multiple helices arranged where at least one first helix located in a first helix section is offset a vertical distance from at least one second helix in a second helix section.

12. The protective tube according to claim 11, wherein the vertical offset of the helices equals a value of a pitch divided by a number of the helices.

13. The protective tube according to claim 1, wherein the at least one helix structure exhibits a cross section, wherein the cross section is:
    a round cross section,
    a box shaped cross section, wherein edges of the at least one helix structure not connected with the hollow body are deflashed or broken and have a radial transition formed between edges of the at least one helix structure adjoining the hollow body and the hollow body,
    a trapezoid cross section, or
    a triangular cross section.

14. The protective tube according to claim 1, further comprising at least one of:
    a flange that is one of connected to the hollow body's upper end, and part of the hollow body and affiliating to the upper end, wherein the hollow body is reinforced by a radius or a contour toward the flange;
    a radial reinforcement of the outer contour in an upper third of the hollow body; or
    a logarithmical tapering of the outer contour in a lower third of the hollow body.

15. The protective tube according to claim 1, wherein a material thickness of the at least one helix structure equals a 0.1-fold to 0.15-fold of a diameter of the hollow body present at a respective position of the helix structure or a diameter present at a different position of the hollow body.

16. The protective tube according to claim 1, configured with at least one of:
   a pitch of the at least one helix structure increasing toward an upper end of the hollow body;
   a material thickness of the at least one helix structure decreasing toward the upper end of the hollow body; or
   a height of the at least one helix structure increasing by half of a tapering of the hollow body toward the lower end of the hollow body.

17. The protective tube according to claim 1, wherein a tip of the hollow body is formed at the lower end of the hollow body, the tip comprising a flattened plane face.

18. The protective tube according to claim 1, wherein two helices run around the hollow body, wherein one of the helices has a positive pitch, wherein one of the helices has a negative pitch, and wherein a modulus of the pitch of both helices is substantially equal.

19. The protective tube according to claim 1, wherein the hollow body and the at least one helix structure are at least one of:
   encased by a plastic resistant to chemicals;
   lined with or made of a metallic alloy or a corrosion resistant nickel base alloy and Monel or a hard alloy on a cobalt chromium basis; or
   formed from a metal alloy with 13 weight-% to 20 weight-% chromium and 9 weight-% to 15 weight-% nickel and 1 weight-% to 4 weight-% molybdenum.

20. A gas sample collector for introduction into a process space having a flow directed in a direction, the gas sample collector comprising:
   a hollow body having an open lower end;
   an upper end having an opening for taking gas samples, wherein the hollow body has an outer contour and an inner surface, wherein the inner surface comprises a cylindrical shape, wherein the outer contour of the hollow body tapers toward the open lower end;
   at least one helix structure, wherein the helix structure is arranged on the outer contour at least in sections or arranged in the outer contour at least in sections,
   wherein the outer contour of the hollow body has an upper section devoid of a helix structure and is conical or has a diameter decreasing toward the open lower end in a nonlinear continuous manner,
   wherein the outer contour of the hollow body has a lower section being cylindrical and comprises at least one helix structure, and
   wherein the helix structure is arranged on the outer contour or arranged in the outer contour.

21. The gas sample collector according to claim 20, wherein the outer contour of the hollow body is conically shaped at least in sections or provided with a diameter decreasing at least in sections toward the open lower end in a nonlinear manner.

22. The gas sample collector according to claim 21, wherein the outer contour of the hollow body is concavely curved in an upper third of the hollow body.

23. A protective tube for sealed introduction into a process space having a flow directed in a direction, the protective tube comprising:
   a hollow body;
   a closed lower end;
   an upper end with an opening configured to introduce a temperature sensor; and
   a contour formed at the upper end, the contour configured for sealing to a process space,
   wherein the hollow body has an outer contour and an inner surface,
   wherein the inner surface comprises a cylindrical shape,
   wherein at least one section of the outer contour tapers toward the closed lower end,
   wherein at least one helix structure is provided, the helix structure being arranged on the outer contour at least in sections or arranged in the outer contour at least in sections,
   wherein the outer contour has an upper section devoid of a helix structure,
   wherein the upper section is conical or provided with a diameter decreasing toward the closed lower end in a nonlinear manner,
   wherein the outer contour has a lower section, wherein the lower section is cylindrical and comprises at least one helix structure,
   and wherein the helix structure is arranged on the outer contour or arranged in the outer contour,
   wherein a further section is arranged between the upper section of the hollow body and the lower section of the hollow body having the at least one helix structure, and
   wherein the further section is configured as a conical transitional section or transitional section with a diameter decreasing in a nonlinear manner.

24. A protective tube for sealed introduction into a process space having a flow directed in a direction, the protective tube comprising:
   a hollow body;
   a closed lower end;
   an upper end with an opening configured to introduce a temperature sensor; and
   a contour formed at the upper end, the contour configured for sealing to a process space,
   wherein the hollow body has an outer contour and an inner surface,
   wherein the inner surface comprises a cylindrical shape,
   wherein at least one section of the outer contour tapers toward the closed lower end,
   wherein at least one helix structure is provided, the helix structure being arranged on the outer contour at least in sections or arranged in the outer contour at least in sections, and
   wherein the protective tube is configured with at least one of;
   a pitch of the at least one helix structure increasing toward an upper end of the hollow body;
   a material thickness of the at least one helix structure decreasing toward the upper end of the hollow body; or
   a height of the at least one helix structure increasing by half of a tapering of the hollow body toward the lower end of the hollow body.

25. A protective tube for sealed introduction into a process space having a flow directed in a direction, the protective tube comprising:
   a hollow body;
   a closed lower end;
   an upper end with an opening configured to introduce a temperature sensor; and
   a contour formed at the upper end, the contour configured for sealing to a process space,
   wherein the hollow body has an outer contour and an inner surface,
   wherein the inner surface comprises a cylindrical shape,
   wherein at least one section of the outer contour tapers toward the closed lower end, wherein at least one helix structure is provided, the helix structure being arranged on the outer contour at least in sections or arranged in the outer contour at least in sections, wherein two helices run around the hollow body, wherein one of the helices has a positive pitch, wherein one of the helices has a negative pitch, and wherein a modulus of the pitch of both helices is substantially equal.

26. A gas sample collector for introduction into a process space having a flow directed in a direction, the gas sample collector comprising:

a hollow body having an open lower end;

an upper end having an opening for taking gas samples, wherein the hollow body has an outer contour and an inner surface, wherein the inner surface comprises a cylindrical shape, wherein the outer contour of the hollow body tapers toward the open lower end; and at least one helix structure, wherein the helix structure is arranged on the outer contour at least in sections or arranged in the outer contour at least in sections, and wherein the outer contour of the hollow body is concavely curved along the full upper third of the hollow body.

* * * * *